United States Patent
Bilobrov

(10) Patent No.: US 9,837,101 B2
(45) Date of Patent: Dec. 5, 2017

(54) INDEXING BASED ON TIME-VARIANT TRANSFORMS OF AN AUDIO SIGNAL'S SPECTROGRAM

(71) Applicant: Facebook, Inc., Menlo Park, CA (US)

(72) Inventor: Sergiy Bilobrov, Santa Clara, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/704,372

(22) Filed: May 5, 2015

(65) Prior Publication Data
US 2016/0148620 A1    May 26, 2016

Related U.S. Application Data

(60) Provisional application No. 62/084,494, filed on Nov. 25, 2014.

(51) Int. Cl.
*G10L 25/54* (2013.01)
*G06F 17/30* (2006.01)

(52) U.S. Cl.
CPC ........ *G10L 25/54* (2013.01); *G06F 17/30743* (2013.01)

(58) Field of Classification Search
CPC ................................. G06F 17/30743
See application file for complete search history.

(56) References Cited

U.S. PATENT DOCUMENTS

| | | | | |
|---|---|---|---|---|
| 8,977,067 B1 * | 3/2015 | Baluja | ........... | G06K 9/00523 382/240 |
| 2009/0290764 A1 * | 11/2009 | Fiebrink | ........... | G06F 17/30743 382/124 |
| 2010/0257129 A1 * | 10/2010 | Lyon | ........... | G10L 25/48 706/12 |
| 2013/0138442 A1 * | 5/2013 | Wang | ........... | G06F 17/30743 704/270 |
| 2013/0197913 A1 * | 8/2013 | Bilobrov | ........... | G06F 17/30743 704/270 |
| 2014/0115716 A1 * | 4/2014 | Schmelzer | ........... | G06F 17/30026 726/26 |
| 2014/0316787 A1 * | 10/2014 | Wang | ........... | G06F 17/30743 704/270 |
| 2014/0330413 A1 * | 11/2014 | Anniballi | ........... | G06F 17/30743 700/94 |
| 2015/0104023 A1 * | 4/2015 | Bilobrov | ........... | G10L 25/54 381/56 |

\* cited by examiner

*Primary Examiner* — Douglas Godbold
(74) *Attorney, Agent, or Firm* — Fenwick & West LLP

(57) ABSTRACT

An audio identification system generates audio fingerprints and indexes associated with the audio fingerprints based on discrete and overlapping frames within a sample of an audio signal. The system applies a time-to-frequency domain transform to a time-sequence of frames, which may be filtered. The audio identification system then applies a time-variant transformation (e.g., a Discrete Cosine Transform) to the transformed frames and generates an audio fingerprint and index by selecting sets of coefficients of the time-variant transformation. The system selects coefficients that are less sensitive to possible noise and/or distortions in the underlying signal, such as low-frequency coefficients. The time-variant transformation provides sufficient sampling among the indexes by incorporating the phase information of the frames into the indexes. The system stores the audio fingerprint and other identifying information by index for efficient retrieval and matching of the retrieved fingerprints.

19 Claims, 6 Drawing Sheets

INDEXING BASED ON TIME-VARIANT TRANSFORMS OF AN AUDIO SIGNAL'S SPECTROGRAM

CROSS REFERENCE TO RELATED APPLICATIONS

This application claims the benefit of U.S. Provisional Application No. 62/084,494, filed on Nov. 25, 2014, the contents of which is incorporated by reference in its entirety.

BACKGROUND

This disclosure generally relates to audio signal identification, and more specifically to noise-insensitive indexing of audio signals using audio fingerprints derived from the audio signals' spectrograms.

Real-time identification of audio signals is increasingly used in various applications. For example, a common application uses audio signal identification methods to identify the name, artist, and/or album of an unknown song. Many audio signal methods generate an audio fingerprint for an audio signal, which includes features of the audio signal usable to identify the audio signal. These features may be based on acoustical and perceptual properties of the audio signal. To identify the audio signal, the audio fingerprint generated from the audio signal is compared to reference audio fingerprints associated with identifying information.

However, conventional audio signal identification techniques based on audio fingerprinting do not effectively manage noise and distortion in an audio signal. Many audio signals contain noise or signal distortions that have unique features themselves, thereby masking the underlying audio signal and making it difficult—or often impossible—to identify the signal. In particular, if the signal to noise ratio is very low (e.g., less than −6 dB), the noise completely masks the signal. Thus, conventional audio identification techniques that treat noise features as an identifying part of the audio signal's fingerprint often incorrectly match the signal to reference audio fingerprints, resulting in false negatives or no identification at all. These false negative identifications can occur because many conventional techniques incorrectly identify a match between the different signals' noisy portions. Additionally, tempo shifting that occurs when an audio signal is played faster or slower than its original speed shifts a signal's spectral content along the time axis, resulting in noise increasingly masking the original signal. Many existing identification techniques using spectral analysis are therefore unable to identify noisy or distorted version of the audio signal accurately.

Furthermore, current audio identification techniques often identify noisy signals at a reduced rate, which includes false negatives, when identifying audio signals based on audio fingerprints including the signal's noisy or distorted portions. In particular, index-based selections of reference fingerprints for matching against a "test" audio fingerprint also suffer from noise and distortion contained in the index of each reference fingerprint.

Many conventional techniques use an index structure to improve the speed of searching and matching fingerprints against a database of reference fingerprints. In the presence of noise and distortions, such techniques often produce index values that fail to match against the indexes contained in the database. By not accounting for noise or distortions, these techniques too often fail to identify proper candidates among the database's reference signals for further matching against the signal's fingerprint, which prevents proper identification of the signal.

To address this noise problem, conventional techniques repeatedly modify the calculated index values of the signal's fingerprint and then search among indexes of the reference fingerprints until identifying a match between the test and reference fingerprints. Such a repetitive permutation process requires a large amount of computational resources, including, for example, excessive memory space to store all possible permutations of the fingerprint indexes. To reduce the amount of index permutations, some techniques calculate the robustness of different index bits and permute only "weak bits" (i.e., bits that are more sensitive to noise or distortions and thus require more processing, or permutations, before identifying a match). But in practice this approach often fails because the noisy or distorted portions of a signal cannot be reliably predicted, which would require extracting the noisy or distorted portions from the test signal before comparing the signal's fingerprint to any reference fingerprint.

SUMMARY

In various embodiments, a system generates an audio fingerprint and an index for referencing the generated audio fingerprint in a database. To generate the fingerprint and index, the system obtains a sample of an audio signal and then determines a plurality of frames within the sample. Each frame represents a time-interval of the sample and overlaps with another frame. In some embodiments, the frames are overlapping by a specified percentage, e.g., by 50%. The system applies a time domain to frequency domain transformation to each frame from the plurality of frames to determine a frequency spectrum for each frame and then selects a time-sequence of these frequency spectrums. This time-sequence refers to a sequence of frames and their corresponding frequency or power spectrums at different times with each frame or spectrum representing an element in the sequence. The system then applies a time-variant transformation to the time-sequence of frequency spectrums, where the time-sequence contains a two-dimensional representation of the signal intensities with frequency in one dimension and time in the other. This two-dimensional representation is also referred to as a time-frequency spectrogram. To compute an audio fingerprint and its index, the system selects a plurality of frequency components of the resulting time-variant transformation. For example, the generated index includes fewer frequency components than the audio fingerprint with the fewer frequency components being less sensitive to noise or distortions included in the sample of the audio signal. Such distortions include, for example, resampling, pitch shift, and time stretch. To generate a series of fingerprints for the audio sample, this process is performed on multiple overlapping time-sequences of frequency spectrums, each producing an audio fingerprint and an associated index. In some embodiments, the time-sequences are highly overlapping, e.g., shifted by one or more samples.

The use of overlapping frames in the process above results in a high redundancy of the generated fingerprints and their associated indexes. The high redundancy reduces the effect of time shift on identifying a candidate fingerprint, while increasing the number of fingerprints and their associated indexes. Despite increasing their number, the fingerprints associated with overlapping frames may not help in identifying a distorted or noisy signal, since these fingerprints do not carry additional features, which can be used for the identification. To compensate for decreased variability among fingerprints due to overlapping frames, and thus to increase the probability of matching distorted fingerprints, the use of a time-variant transformation incorporates phase differences between subsequent frequency spectrums into generating the audio fingerprints. In turn, the associated indexes also differ in part based on the phase difference among the frequency spectrums. Applying the time-variant transformation effectively alters multiple bits (e.g., 3-4 bits) in two indexes from fingerprints that differ by a shift of only one frame along the time axis. With the time-variant transformation, the indexes include multiple representations of the redundant signal, which carry different sensitivities to signal noise and/or distortions. Using an index that is less sensitive to signal noise and/or distortions improves the speed and accuracy of identifying by index candidate fingerprints among multiple indexed reference fingerprints to match against the signal's fingerprints.

Selecting noise- and/or distortion-stable (e.g., low-frequency) components of the transformed time-frequency spectrogram for generating the index reduces the influence of the signal noise and/or distortion on the index bits. The magnitudes of frequencies in a time-frequency spectrogram after applying the time-variant transformation represents the intensity of a particular spectral component and therefore provides an estimate of the transformation's sensitivity to noise and distortions. In some embodiments, the system uses this estimate to identify stable or unstable regions within the spectrogram. Stable and unstable regions refer to regions in the spectrogram that vary less or more when increasing the noise or distortions in the signal.

The features and advantages described in this summary and the following detailed description are not all-inclusive. Many additional features and advantages will be apparent to one of ordinary skill in the art in view of the drawings, specification, and claims hereof.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Overview

Figure 1:
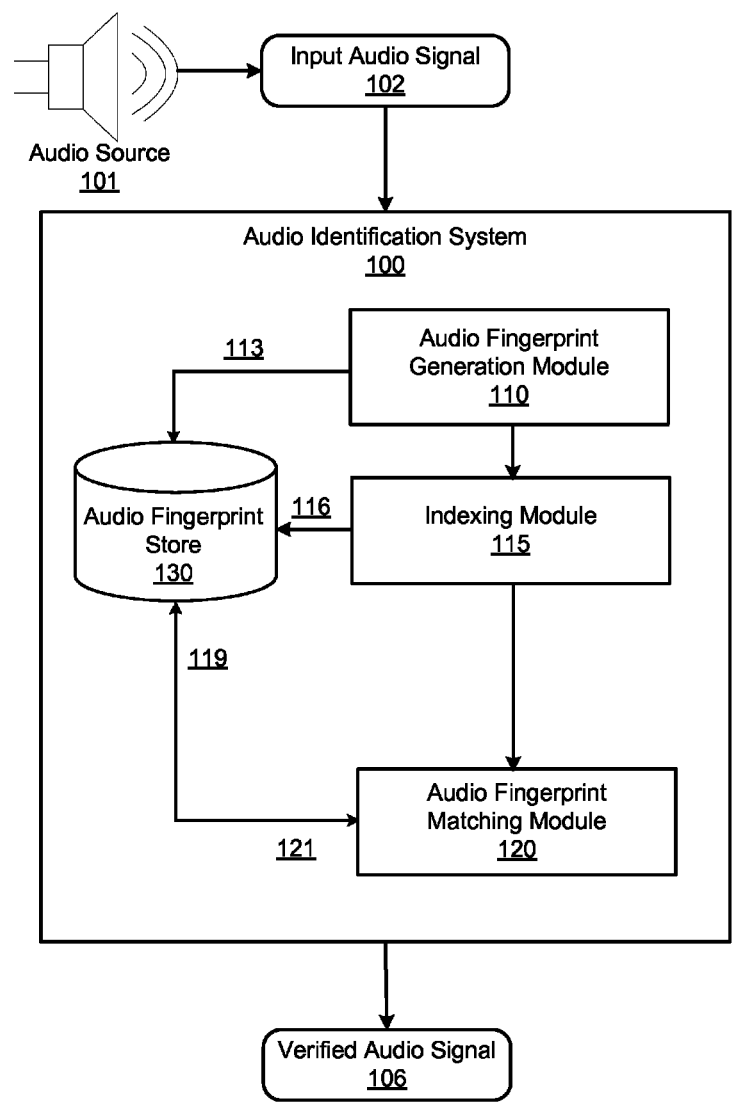
FIG. 1 is a block diagram of a process for identifying audio signals, in accordance with some embodiments.

Disclosed embodiments enable the identification of audio signals based on indexed audio fingerprints with a reduced sensitive to noise and/or distortions present in the signals. FIG. 1 illustrates an audio identification system 100 indexing and identifying an audio signal 102 based on the signal's audio fingerprint, according to some embodiments. As shown in FIG. 1, the audio identification system 100 includes an audio fingerprint generation module 110, an indexing module 115, an audio fingerprint matching module 120, and an audio fingerprint store 130. The audio identification system 100 receives an audio signal 102 generated by an audio source 101, generates an audio fingerprint 113 of the audio signal 102, generates an noise- and/or distortion-insensitive fingerprint index 116 based on the fingerprint 113, and stores the audio fingerprint by the index 116 in the store 130. In some embodiments, the system 100 retrieves by index a set of candidate reference audio fingerprints 119 and identifying information 119 from the store 130, and matches each fingerprint 119 from the set against the fingerprint 121 of the received audio signal 102.

In some embodiments, the audio fingerprint generation module 110 preprocesses an audio signal 102, transforms the audio signal from time domain to frequency domain, filters the transformed audio signal, applies a time-variant transformation to the (filtered or unfiltered) audio signal, and generates an audio fingerprint 113 from the result of applying the time-variant transformation. The indexing module 115 then generates a noise- and/or distortion-insensitive index 116 based on the audio fingerprint 113 by selecting low-frequency components of the time-variant transformation. A transformation (i.e. a function) is herein referred to as the mathematical description of mapping a set of elements onto another set of elements, whereas a transform is a particular representation of a transformation, e.g., a Fast Fourier Transform (FFT), a Discrete Cosine Transform (DCT), and the like, including the components (i.e. coefficients) of such transform. In some embodiments, the audio fingerprint matching module 120 retrieves based on the generated index 116 of the audio signal 102 a set of candidate reference audio fingerprints 119 stored in the audio fingerprint store 130. In some embodiments, the matching module 120 then matches the audio fingerprint 113 generated from the signal 102 against the retrieved candidate reference audio fingerprints 119. If the matching module 120 identifies a match among the candidate reference fingerprints, the module outputs a verified audio signal 106.

In some embodiment, preprocessing the received audio signal includes converting the audio signal into multiple audio features and selecting a subset of these features for generating an audio fingerprint of the signal 102. Other examples of audio signal preprocessing include analog-to-digital conversion, if the audio signal is in analog representation, extracting metadata associated with the audio signal, coding/decoding the audio signal for mobile applications, normalizing the amplitude, e.g., bounding the dynamic range of the audio signal to a predetermined range, and dividing the audio signal into multiple audio frames corresponding to varying velocity of the underlying signal's acoustic events. Other audio signal preprocessing operations known to those of ordinary skill in the art may also be performed.

As shown in FIG. 1, an audio source 101 generates the audio signal 102. The audio source 101 may be any entity suitable for generating audio (or a representation of audio), such as a person, an animal, speakers of a mobile device, a desktop computer transmitting a data representation of a song, or other suitable entity generating audio. To identify an audio signal, the audio identification system 100 generates one or more audio fingerprints for the audio signal by receiving a sample of the audio signal 102. A sample includes a plurality of discrete frames each corresponding to different overlapping time intervals of the audio signal 102 at a particular time t as further described with respect to FIGS. 3A and 3B. The audio identification system 100 first divides the audio signal 102 into one or more discrete audio frames. In some embodiments, a sample corresponding to one second of the audio signal 102 includes 20 discrete frames each corresponding to 20 100-ms time intervals of the audio signal with an overlap of 50% between consecutive frames. In some embodiments, each audio frame of the audio signal 102 corresponds to time intervals of varying lengths, such as 25 ms, 50 ms, 100 ms, 200 ms, etc. In some embodiments, each frame overlaps with its neighboring frames by about 33%. In some embodiments, the overlap is selected from a percentage value that falls within the range from about 10% to about 50%. In some embodiments, the overlap is a percentage such that the fingerprint indexes based on time intervals differing by a one-frame time shift include less than four altered bits. Upon receiving the one or more audio frames of the audio signal 102, the audio fingerprint generation module 110 generates an audio fingerprint 113 from a plurality of subsequent frames of the audio signal 102. The audio fingerprint 113 of the audio signal 102 may include characteristic information describing the audio signal 102. Such characteristic information may indicate acoustical and/or perceptual properties of the audio signal 102. To generate the audio fingerprint 113 of the audio signal 102, the audio fingerprint generation module 110 preprocesses the audio signal 102 and then transforms the audio signal 102 from one domain to another domain (i.e. from time to frequency domain). For transforming the signal, the audio fingerprint generation module 110 applies a time-to-frequency transformation to a time-sequence of overlapping frames to determine each frame's frequency spectrum (i.e. spectral profile). By combining multiple spectral profiles, the module 110 generates a time-frequency spectrogram for the time-sequence of overlapping frames. In some embodiments, the audio fingerprint generation module 110 applies a band-pass filter to the frequency spectrum of each frame to generate multiple sub-samples corresponding to different frequency bands of the audio signal 102. In some embodiments, the audio fingerprint generation module 110 uses a time sequence of filtered spectral frequency components (coefficients) of the transformed frames for generating the spectrogram.

The fingerprint generation module 110 then applies a time-variant transformation to the (filtered or unfiltered) frequency components of the time-frequency spectrogram. The time-frequency spectrogram is a two-dimensional array or representation of the signal intensities with frequency in one dimension and time in the other. A matrix including the coefficients of the time-variant transformation represents a plurality of long-term characteristics of the audio signal. A time-variant transformation refers to a transformation having coefficients that also depend on the phase information of frequency components in the spectrogram. Representative time-variant transformations include, but are not limited to, a Fast Fourier transform (FFT), a Discrete Hartley transform (DHT), a Discrete Wavelet Transform (DWT), a Discrete Sine Transform (DST), a Mellin Transform, a Discrete Cosine transform (DCT), and the like.

The fingerprint generation module 110 then generates an audio fingerprint 113 from the result of applying the time-variant transformation to the spectrogram. The fingerprint generation module 110 selects a number of coefficients of the time-variant transformation for generating the audio fingerprint 113. For example, the fingerprint generation module 110 identifies the sign information of the selected coefficients as an audio fingerprint associated with the sample of the audio signal 102. Including phase information among fingerprints from overlapping frames allows the system to preserve time-sensitive characteristics of the audio signal. In some embodiments, the selected coefficients include frequency components that are less sensitive to noise and/or distortions, e.g., low-frequency components of the spectrogram. In some embodiments, the system efficiently quantizes the phase information of subsequent frames, which is stored separately or represented as a sign of the corresponding coefficient. Generation (i.e. quantization) of an audio fingerprint is further described below and in detail in U.S. Patent Pub. No. 2012/0209612, which is hereby incorporated by its entirety. In some embodiments, the sign information of the selected coefficients is stored by using an extra bit in the representation of the fingerprint.

The indexing module 115 then generates an index for each audio fingerprint 113 of the audio signal based on the time-variant transformation. In some embodiments, the module 115 stores the audio fingerprint 113 according to the generated index in the audio fingerprint store 130. Using a time-variant transformation maximizes the variability among the audio fingerprints of an audio signal, including their low frequency components, as the time-variant transformation incorporates amplitude and phase differences among subsequent frames of the audio signal 102. Low frequency coefficients of the audio fingerprint 113 that are large in magnitude correspond to components of the audio signal 102 that are less sensitive to noise or distortions. The large-magnitude low frequency components of the audio fingerprint 113 therefore identify "stable" representations of the audio signal 102 with respect to noise and distortions. Portions of the audio fingerprint that are generally more sensitive to noise or distortions, e.g., high frequency or small-magnitude components, are referred to as "unstable" portions of the audio signal 102. In some embodiments, the indexing module 115 identifies coefficients of the time-variant transformation falling below a "stability" condition as stable components of the audio fingerprint 113, thus representing less noisy or distorted characteristics of the audio signal 102. The stability condition is determined based on the spectral component frequency and magnitude. Examples of the stability condition include a cutoff frequency equal to a quarter of the sampling frequency ($F_s/4$) or equal to the average or median magnitude of all spectral components in the selected frequency range.

The indexes include components of the time-variant transformation that are less sensitive to signal noise and/or distortions. Using an index that is less sensitive to signal noise and/or distortions noise-/distortion-insensitive indexes improves the speed and accuracy in identifying by index candidate fingerprints among multiple indexed reference fingerprints to match against the signal's fingerprints. The system generates audio fingerprints of the sample based on a finite sequence of frames at different sample times. In some embodiments, the sample includes a plurality of discrete frames, where each frame corresponds to different overlapping time intervals of the audio signal.

In some embodiment, the indexing module 115 determines an index associated with the audio fingerprint based on a subset of the selected coefficients of the time-variant transformation. For example, the indexing module 115 determines the index as coefficients corresponding to components of the transformation having less than a threshold frequency. In some embodiments, the indexing module 115 identifies the index as a subset of the selected coefficients corresponding to representation of the sample having more than a threshold magnitude. For example, the indexing module 115 identifies coefficients corresponding to portions of the sample having a frequency spectrum below a threshold sensitivity to noise or signal distortions as the index associated with the audio fingerprint. Generally, the larger the magnitude of the component is, the less sensitive this component is to noise or distortions. Thus, a threshold sensitivity is selected so that at least 90% of the large-magnitude, low frequency components lie above the threshold. In some embodiments, the threshold sensitivity captures at least 80% of such components, and in some embodiments, it captures at least 70%. Upon generating the index, the indexing module 115 stores the corresponding audio fingerprint by its index within the audio fingerprint store 130.

Selecting noise- and/or distortion-stable (e.g., low-frequency) components of the transformed time-frequency spectrogram for generating the index minimizes the influence of the signal noise and/or distortion on the index bits. The magnitudes of frequencies in a time-frequency spectrogram after applying the time-variant transformation represents the intensity (i.e. strength) of a particular spectral component, and therefore provides an estimate of the transformation's sensitivity to noise and distortions. In some embodiments, the system uses this estimate to identify stable or unstable regions within the spectrogram. Stable and unstable regions refer to regions in the spectrogram that vary less or more when increasing the noise or distortions in the signal.

In some embodiments, the system uses the stable regions to generate the index used with a hash table or other indexing approach to find candidate fingerprints among indexed references fingerprints. For severely distorted or noisy samples of audio signal, for which an index based on stable regions does not return any suitable candidate fingerprints, in some embodiments, the system proceeds using the less stable regions within the time-variant transformed spectrogram to generate a fingerprint index. In some embodiments, the system uses a modified standard permutation techniques to permute bits of the index repeatedly if the non-modified index does not identify a candidate fingerprint.

The audio fingerprint store 130 stores the audio fingerprints of audio signals. Some of the stored audio fingerprints are generated from one or more reference audio signals with known identifying information. In some embodiments, the audio fingerprint store 130 stores indexes of the audio fingerprints, with each audio fingerprint associated with an index. In some embodiments, the indexing module 115 associates each stored audio fingerprint with its index based on selected low-frequency components of the time-invariant transformation. For example, a set of bits from an audio fingerprint corresponding to low frequency components of the time-variant transformation are used as the index.

Each stored audio fingerprint in the audio fingerprint store 130 is also associated with identifying information and/or other information related to the audio signal from which the audio fingerprint was generated. The identifying information may be any data suitable for identifying an audio signal. For example, the identifying information associated with a reference audio fingerprint includes title, artist, album, publisher information for the corresponding audio signal. Identifying information may also include data indicating the source of an audio signal corresponding to a reference audio fingerprint. For example, the reference audio signal of an audio-based advertisement may be broadcast from a specific geographic location, so a reference audio fingerprint corresponding to the reference audio signal is associated with an identifier indicating the geographic location (e.g., a location name, global positioning system (GPS) coordinates, etc.).

Prior to matching an audio signal to stored reference signals, the audio fingerprint matching module 120 uses the index associated with the audio signal to identify a set of candidate reference audio signals that have the identical index value. In some embodiments, the matching module 120 employs a hash table or map based on the stored indexes to identify candidate reference fingerprints from the store 130. In some embodiments, the index provides the address to the associated fingerprint in the store 130, thus providing a means for retrieving this fingerprint from the store. In some embodiments, the index's underlying data structure allows for a fast retrieval of a list of candidate reference signals by means of their indexes. In some embodiments, the index's data structure includes a list of weak (non-stable) bits in the reference fingerprint. In some embodiments, an additional index of an associated fingerprint is created by permuting a set of test index bits at specified toggle positions along the bit string of the index. Preferably, indexes that have non-stable bits in the toggle position are considered for creating additional indexes, since these indexes are more sensitive to noise and distortions than indexes with stable bits at the toggle positions. In some cases, the index of a sample fingerprint may match multiple reference fingerprint indexes with none of those reference fingerprints matching the sample fingerprint, thus failing to identify the underlying audio signal. In these cases, the index of the sample fingerprint may be modified to identify additional candidate reference fingerprints for matching against the sample fingerprint as follows.

The matching module 120 identifies candidate reference audio fingerprints that have identical index values as the fingerprint of signal 102. The matching module 120 then compares these candidate fingerprints to the fingerprint of the signal to determine a match. In case that the indexes in audio fingerprint store 130 do not include the signal's index value, the matching module modifies the signal's index value and checks the modified value against the indexes in the store. To generate a modified index, the matching module 120, for example, transposes one or more bits of the signal's index value.

In some embodiments, the audio fingerprint matching module 120 then matches the candidate reference fingerprints against the fingerprint of the received audio signal 102. In some embodiments, to identify a match the audio fingerprint matching module 120 calculates the phase correlation between the audio fingerprint 113 and any of the candidate reference fingerprints. In some embodiments, since the time-variant transformation preserves the signal's phase, the phase correlation in form of a normalized cross-correlation is used to determine a match between fingerprints. For example, a normalized cross-correlation between two fingerprints equals the cosine of the angle between the corresponding vectors of the fingerprints. Thus, the correlation equals "1" if the vectors are parallel to each other and "0" if they are orthogonal. The correlation measures the similarity in the audio characteristics between the audio signal 102 and the reference signals. The phase correlation allows identification of repeating patterns in the underlying signal, for example, the beat and tempo of music included in the signal. The matching module 120 identifies a match if there is at least a threshold correlation between the audio fingerprint 113 and one of the candidate reference fingerprints. In some embodiments, the threshold correlation has a value of about 0.1. In some embodiments, the comparison is based on a bit error rate (BER) between the test fingerprint and the reference fingerprint. The BER between two audio fingerprints is the percentage of their corresponding bits that do not match. If the BER of the reference fingerprint with the test audio fingerprint is below a BER threshold, the matching module 120 returns the match. In some embodiments, the matching module 120 retrieves information associated with a candidate reference audio fingerprint matching the audio fingerprint 113 from the store 130, stores the audio fingerprint 113 in the store, and associates the retrieved information with the stored audio fingerprint 113.

System Architecture

Figure 2:
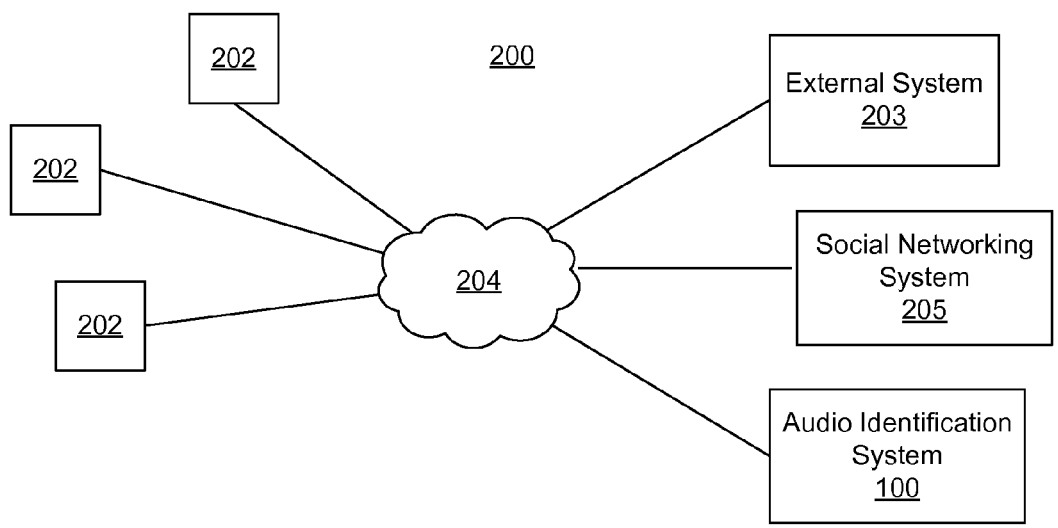
FIG. 2 is a block diagram of a system environment including an audio identification system, in accordance with some embodiments.

FIG. 2 is a block diagram illustrating one embodiment of a system environment 200 including an audio identification system 100, according to some embodiments. As shown in FIG. 2, the system environment 200 includes one or more client devices 202, one or more external systems 203, the audio identification system 100 and a social networking system 205 connected through a network 204. While FIG. 2 shows three client devices 202, one social networking system 205, and one external system 203, it should be appreciated that any number of these entities (including millions) may be included. In alternative configurations, different and/or additional entities may also be included in the system environment 200. Furthermore, in some embodiments, the audio identification system 100 can be a system or module running on or otherwise included within one of the other entities shown in FIG. 2.

A client device 202 is a computing device capable of receiving user input, as well as transmitting and/or receiving data via the network 204. In one embodiment, a client device 202 sends a request to the audio identification system 100 to identify an audio signal captured or otherwise obtained by the client device 202. The client device 202 may additionally provide the audio signal or a digital representation of the audio signal to the audio identification system 100. Examples of client devices 202 include desktop computers, laptop computers, tablet computers (pads), mobile phones, personal digital assistants (PDAs), gaming devices, or any other device including computing functionality and data communication capabilities. Hence, the client devices 202 enable users to access the audio identification system 100, the social networking system 205, and/or one or more external systems 203. In one embodiment, the client devices 202 also allow various users to communicate with one another via the social networking system 205.

The network 204 may be any wired or wireless local area network (LAN) and/or wide area network (WAN), such as an intranet, an extranet, or the Internet. The network 204 provides communication capabilities between one or more client devices 202, the audio identification system 100, the social networking system 205, and/or one or more external systems 203. In various embodiments the network 204 uses standard communication technologies and/or protocols. Examples of technologies used by the network 204 include Ethernet, 802.11, 3G, 4G, 802.16, or any other suitable communication technology. The network 204 may use wireless, wired, or a combination of wireless and wired communication technologies. Examples of protocols used by the network 204 include transmission control protocol/Internet protocol (TCP/IP), hypertext transport protocol (HTTP), simple mail transfer protocol (SMTP), file transfer protocol (TCP), or any other suitable communication protocol.

The external system 203 is coupled to the network 204 to communicate with the audio identification system 100, the social networking system 205, and/or with one or more client devices 202. The external system 203 provides content and/or other information to one or more client devices 202, the social networking system 205, and/or to the audio identification system 100. Examples of content and/or other information provided by the external system 203 include identifying information associated with reference audio fingerprints, content (e.g., audio, video, etc.) associated with identifying information, or other suitable information.

The social networking system 205 is coupled to the network 204 to communicate with the audio identification system 100, the external system 203, and/or with one or more client devices 202. The social networking system 205 is a computing system allowing its users to communicate, or to interact otherwise, with each other and to access content. The social networking system 205 additionally permits users to establish connections (e.g., friendship type relationships, follower type relationships, etc.) between one another. Though the social networking system 205 is included in the embodiment of FIG. 2, the audio identification system 100 can operate in environments that do not include a social networking system, including within any environment for which detection of distortion of audio signals is desirable.

In one embodiment, the social networking system 205 stores user accounts describing its users. User profiles are associated with the user accounts and include information describing the users, such as demographic data (e.g., gender information), biographic data (e.g., interest information), etc. Using information in the user profiles, connections between users, and any other suitable information, the social networking system 205 maintains a social graph of nodes interconnected by edges. Each node in the social graph represents an object associated with the social networking system 205 that may act on and/or be acted upon by another object associated with the social networking system 205. An edge between two nodes in the social graph represents a particular kind of connection between the two nodes. For example, an edge may indicate that a particular user of the social networking system 205 is currently "listening" to a certain song. In one embodiment, the social networking system 205 may use edges to generate stories describing actions performed by users, which are communicated to one or more additional users connected to the users through the social networking system 205. For example, the social networking system 205 may present a story about a user listening to a song to additional users connected to the user.

In other embodiments, any of the described functionalities of the audio identification system 100 may be performed by the client devices 102, the external system 203, the social networking system 205, and/or any other suitable entity. For example, the client devices 102 may be configured to determine a suitable length for a sample for fingerprinting, generate a test fingerprint usable for identifying an audio signal, and/or determine identifying information for an audio signal. In some embodiments, the social networking system 205 and/or the external system 203 may include the audio identification system 100.

Noise-/Distortion-Insensitive Indexing of Audio Fingerprints

Figure 3A:
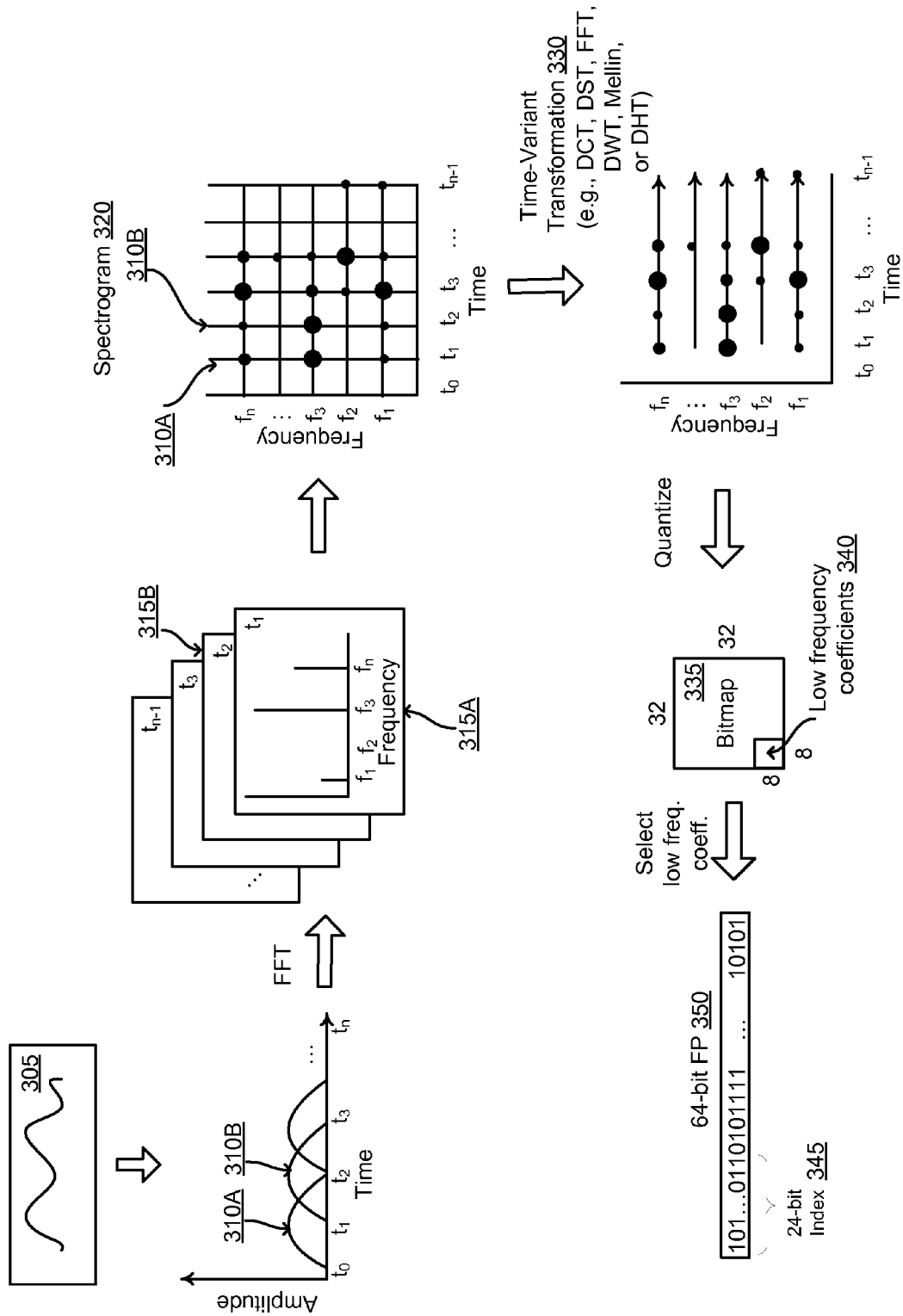
FIG. 3A is a process flow diagram of generating an audio fingerprint, in accordance with some embodiments.
Figure 3B:
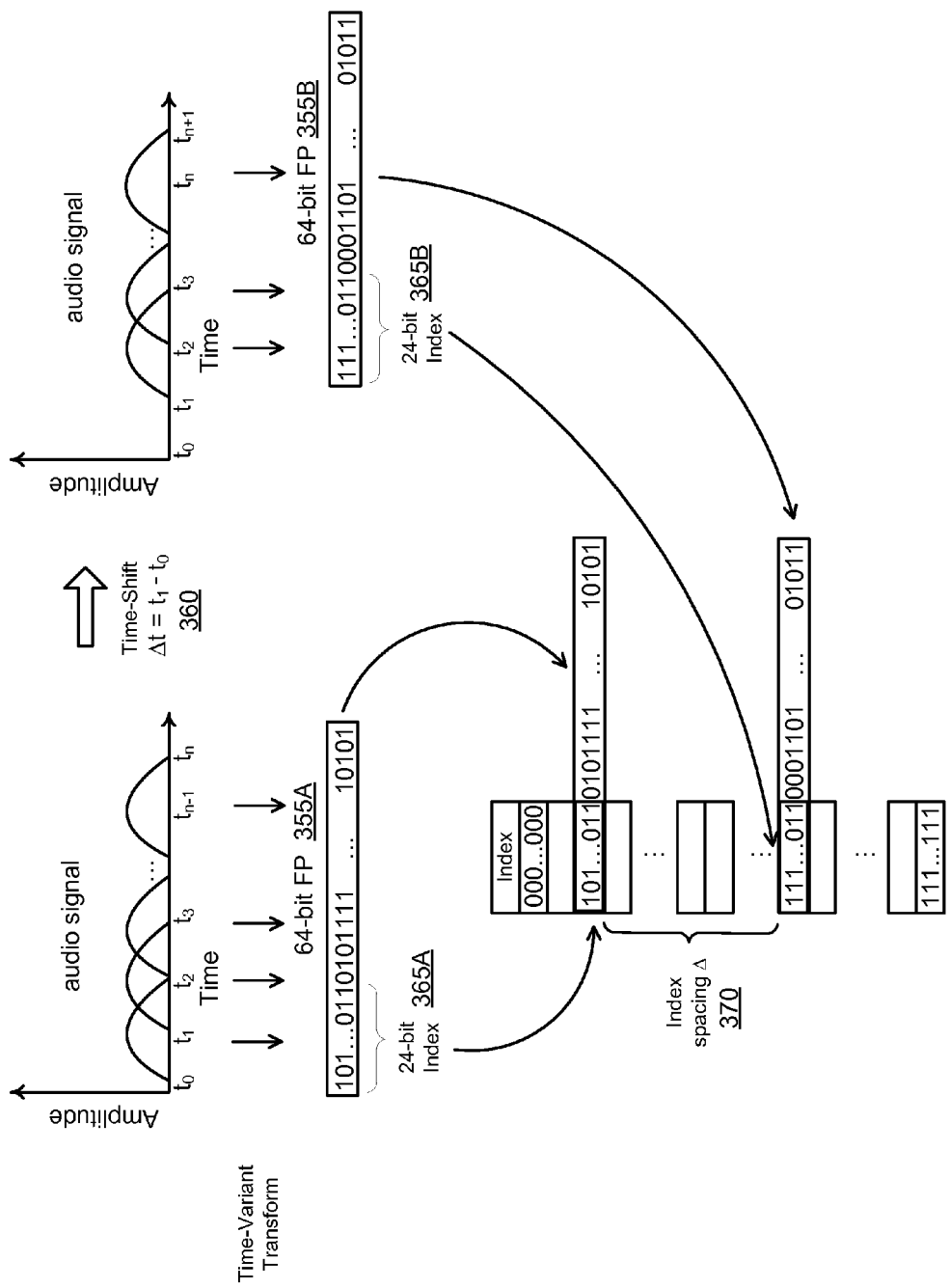
FIG. 3B is a process flow diagram of generating an audio fingerprint, in accordance with some embodiments.

The process flow diagrams of FIGS. 3A and 3B illustrate generating a noise- and/or distortion-insensitive index of audio fingerprints, according to some embodiments. In some embodiments, the audio fingerprint generation module 110 transforms the audio signal from one domain to another domain for noise- and/or distortion-insensitive indexing of audio fingerprints in addition to efficient compression of the signal's data. In some embodiments, the audio fingerprint generation module 110 transforms the audio signal from time domain to frequency domain by applying a Short-Time Fourier Transform (STFT). Other embodiments may use other types of time-to-frequency transforms to generate a time-sequence of frequency (power) spectra for the signal. Based on the time-to-frequency domain transform of the audio signal, frequency spectrum information for each transformed frame of the audio signal is obtained over a range of frequencies, such as 250 to 2250 Hz.

Example of Generating Time-Sequence of Frequency Spectrums

As shown in FIG. 3A, the audio identification system 100 receives an audio signal 305 and identifies multiple frames 310A, 310B from the audio signal 305. Each frame 310A, 310B corresponds to a different time interval of the audio signal, and overlaps with a neighboring frame. For example, frame 310B overlaps with frame 310A by about 33%, or by any suitable amount of overlap in various embodiments. A time-to-frequency domain transform, such as a STFT, is applied to each frame 310A, 310B, generating a frequency spectrum 315A, 315B for each frame 310A, 310B. In FIG. 3A, frequency spectrum 315A corresponds to frame 310A at time $t_1$, while frequency spectrum 315B corresponds to frame 310B at time $t_2$. In some embodiments, a discrete audio signal x[n] in the time domain is sampled at a sampling frequency $F_s$. x[n] is divided into frames with frame step p samples. For a frame, corresponding to sample time $t_1$, STFT transform is performed on the audio signal weighted by a window function w[n] as follows in Equation (1):

$$X[t,k]=\Sigma_{n=0}^{M-1}w[n]x[n+t]e^{-2\pi jnk/M} \quad (1)$$

where parameter k and parameter M denote a bin number and the window size, respectively.

In some embodiments (not shown), each frequency spectrum is split into multiple filter banks, thus creating multiple sub-band samples corresponding to different frequency bands of the audio signal 305. The audio fingerprint generation module 110 then filters the transformed audio signal. In some embodiments, the audio fingerprint generation module 110 applies a B-band third octave triangular filter bank to each spectral frame of the transformed audio signal. Other embodiments may use other types of filter banks. In a third-octave filter bank, spacing between centers of adjacent bands is equal to one-third octave. In some embodiments, the center frequency $f_c[k]$ of the k-th filter is defined as in Equation (2)

$$f_c[k]=2^{k/3}F_0 \quad (2)$$

where parameter $F_0$ is set to 250 Hz and the number of filter banks, B, is set to 16. The upper and lower band edges in the k-th band are equal to the central frequencies of the next and the previous bands, respectively. By applying the band-pass filters, multiple sub-band samples corresponding to different frequency bands of the audio signal are generated.

Let fb[i] be the spectral output of filter bank after processing the i-th frame. fb[i] includes B bins, each bin containing spectral power of the corresponding spectral bandwidth. A sequence of $N_{fb}$ consecutive frames containing spectral power starting from fb[i] is used to generate a sub-fingerprint $F_{sub}[i]$. In one embodiment, the number of consecutive frames $N_{fb}$ is set to 32. Upon filtering the transformed audio signal, a $B \times N_{fb}$ matrix is obtained and normalized along the time dimension to remove possible equalization effect in the audio signal.

The spectrogram 320 of the filter bank indicates the spectral power of various spectral bandwidths for multiple frames 310A, 310B, etc. at time $t_1$ to $t_{n-1}$. A sequence of $N_{fb}$ consecutive frames containing spectral power starting from fb[i] is used to generate a sub-fingerprint, from which a $B \times N_{fb}$ matrix is obtained and normalized by row to remove possible equalization effect in the audio signal 305.

Example of Time-Variant Transformation

A time-variant transformation 330 is applied to the output 320 of the filter bank to obtain a matrix of transform coefficients from which a set of coefficients are selected as the audio fingerprint. A transformation is referred to as time-variant when the coefficients of the transformation are not constant but change their values upon shifting the transformation along the time axis. For example, a 1-bit time shift of a time-variant transformation, such as a Discrete Cosine Transformation (DCT), results in a change of 3-4 bits in a 32-bit fingerprint sample. Since a time-variant transformation is not invariant under time shifts, the coefficients of such transformations depend on the phase information included in the spectrogram. Applying a time-variant transformation results in multiple fingerprint coefficients being altered for adjacent frames. The audio identification system 100 maintains the sign information of the selected coefficients. For example, if a selected coefficient is greater than or equal to zero, a bit of "1" is included in the audio fingerprint, while a bit of "0" is included in the audio fingerprint if the selected coefficient is less than zero.

To generate an audio fingerprint for the audio signal, the audio fingerprint generation module 110 applies a time-variant transform to the filtered transformed audio signal. In some embodiments, a Discrete Cosine Transform (DCT) is applied to the time dimension of the normalized matrix $B \times N_{fb}$ generated from the filtering to determine a matrix D of DCT coefficients. From DCT coefficients in the matrix D, the audio fingerprint generation module 110 selects a set of coefficients as the audio fingerprint of the audio signal. For example, the audio fingerprint generation module 110 selects a subset of 64 coefficients to represent an audio fingerprint of the audio signal. In one embodiment, the audio fingerprint generation module 110 selects the first 4 odd columns of the DCT coefficients from the DCT coefficients matrix D, resulting in a [4×16] matrix $F_{sub}$ to represent the audio fingerprint. To represent the audio fingerprint $F_{sub}$ as a 64-bit integer, the audio fingerprint generation module 110 keeps only sign information of the selected DCT, or other, coefficients. The sign information of DCT coefficients is robust against quantization noise (e.g., scalar quantization errors) because positive signs of DCT coefficients do not change to negative signs and vice versa. In addition, the concise expression of DCT signs saves memory space. Other examples of time-variant transformations include a Fast Fourier Transform (FFT), a Discrete Hartley Transform (DHT), a Discrete Wavelet Transform (DWT), a Discrete Sine Transform (DST), a Mellin Transform, or any other transform having coefficients depending on phase information. The generation of an audio fingerprint is further described below.

The indexing module 115 generates an index associated with the generated audio fingerprint, allowing more efficient identification and retrieval of the audio fingerprint based on the associated index. In an embodiment, the index associated with an audio fingerprint is a portion of the audio fingerprint or a hash value generated by applying a hash function to the audio fingerprint. As further shown in FIG. 3A, an audio fingerprint comprises an [8×8] matrix of bits based on coefficients determined by applying the time-variant transform to the filtered or unfiltered transformed audio signal; for example, the [8×8] matrix corresponds to a subset of coefficients selected from a [32×32] matrix 335 determined from application of a DCT transform and subsequent quantization. The indexing module 115 identifies a set of bits from the [8×8] matrix 340 used as the index associated with the audio fingerprint. For example, the indexing module 115 identifies bits from the leftmost columns of the matrix as the index associated with the audio fingerprint. In one embodiment, bits from the leftmost three columns of the 8×8 matrix are used as the index, resulting in a 24-bit index 345 associated with a 64-bit audio fingerprint 350 represented by the 8×8 matrix.

In this example, the audio fingerprint 350 is identified as a 64-bit integer, with the indexing module 115 identifying a set of bits from the integer as the index 345 associated with the audio fingerprint; for example, the audio fingerprint in this embodiment comprises a 64-bit string. The indexing module 115 uses the bits from the leftmost columns as the index. With a fingerprint 105 represented by a [8×8] matrix of bits, the index for the fingerprint 105 may be the leftmost three columns of bits (24 bits in total). In some embodiments, the audio fingerprint may then be stored in the audio fingerprint store 130 as a 64-bit integer 350 that is associated with the 24-bit index 345. Thus, the bits used as the index for an audio fingerprint are a subset of the fingerprint based on the low frequency spectral coefficients of the result of application of the time-variant transform to the filtered and transformed frames of the sample of the audio signal. These low-frequency spectral components are relatively insensitive to noise and distortion, increasing the likelihood that audio fingerprints representing the same audio signal are associated with matching, or similar, indices.

The audio fingerprint store 130 stores one or more reference audio fingerprints, which are audio fingerprints previously generated from one or more reference audio signals by the audio identification system 100 or by another suitable entity. Each reference audio fingerprint in the audio fingerprint store 130 is also associated with identifying information and/or other information related to the audio signal from which the reference audio fingerprint was generated. The identifying information may be any data suitable for identifying an audio signal. For example, the identifying information associated with a reference audio fingerprint includes title, artist, album, publisher information for the corresponding audio signal. As another example, identifying information may include data indicating the source of an audio signal corresponding to a reference audio fingerprint. As specific examples, the identifying information may indicate that the source of a reference audio signal is a particular type of automobile or may indicate the location from which the reference audio signal corresponding to a reference audio fingerprint was broadcast. For example, the reference audio signal of an audio-based advertisement may be broadcast from a specific geographic location, so a reference audio fingerprint corresponding to the reference audio signal is associated with an identifier indicating the geographic location (e.g., a location name, global positioning system coordinates, etc.). In one embodiment, the audio fingerprint store 130 associates an index with each reference audio fingerprint, as described above.

Time-Shift Example of Fingerprints

As shown in FIG. 3B, the audio identification system 100 generates different indexes 355A, 355B for fingerprint that are shifted along the time axis by one frame (i.e. a time interval of Δt 360). In the shown embodiment, the system stores index in an index table with each index references the associated fingerprint. By applying a time-variant transformation prior to fingerprint generation (i.e. quantization), the indexes 365A, 365B of even neighboring fingerprints differ by multiple bits, e.g., 3-4 bits for a 24-bit index. In turn, a time-shift of one frame proves sufficient to sample different parts of the index table separated by an index spacing Δ 370. Thus, instead of iteratively permuting individual index bits to sample the index table the system can effectively sample a larger index table by generating indexes based on one-frame incremental time-shifts.

The system applies the time-variant transformation to the time-sequence of frequency spectrums (profiles) obtained by transforming overlapping frames (i.e., time intervals) of the audio signal from time to frequency domain. Since a shift in the time domain between different frames translates into a phase shift in the frequency domain, the phase shift after quantization results in variation (e.g., permutations) of the bits in the fingerprints corresponding to the different frames. In some embodiments, the overlap among adjacent frames is about 33% or about 50%. In some embodiments, the overlap has a percentage value in the ranges from about 10% to about 50%. A time-sequence refers to a sequence of frames and their corresponding frequency or power spectrums at different times with each frame or spectrum representing an element in the sequence. In some embodiments, the system generates a time-frequency spectrogram from transforming the overlapping time intervals into frequency space and graphing the resulting frequency spectrums along the time variable.

The use of overlapping frames results in a higher resolution of the generated fingerprints and their associated indexes. The higher resolution further reduces the effect of signal noise and/or distortions on identifying a candidate fingerprint. To compensate for decreased variability among fingerprints due to overlapping frames, and thus to avoid redundancy, the use of a time-variant transformation assures that the system incorporates phase differences between subsequent frequency spectrums into generating the audio fingerprints. In turn, the associated indexes also differ in part based on the phase difference among the frequency spectrums. Applying the time-variant transformation effectively alters multiple bits (e.g., 3-4 bits) in two indexes from fingerprints that differ by a shift of only one frame along the time axis.

Matching Audio Fingerprints

The audio fingerprint matching module 120 receives an audio fingerprint associated with a sample of an audio signal and calculates a correlation between the sample's audio fingerprint and set of candidate reference audio fingerprints stored in the audio fingerprint store 130. In some embodiment, the audio fingerprint matching module 120 retrieves the set of candidate reference audio fingerprints from an audio fingerprint store 130 based on an index generated from the sample fingerprint. The correlation between the sample fingerprint of the audio signal and a reference audio fingerprint measures a similarity between the audio characteristics of the sample fingerprint and the audio characteristics of the reference audio fingerprint. In some embodiment, the correlation is a bit error rate (BER) between the sample fingerprint and the reference audio fingerprint. As another example, the correlation between the sample fingerprint of the audio signal and the reference audio fingerprint is determined by applying an inverse time-frequency transform to the selected coefficients comprising the test audio fingerprint and comprising the reference audio fingerprint.

Let $F_{sub}(i)$ be the i-th column of selected coefficients of the sample fingerprint and $G_{sub}(i)$ be the i-th column of selected coefficients of the reference audio fingerprint. $F_{sub}(i)$ and $G_{sub}(i)$ are generated by the audio fingerprint generation module 110 described above. DCT sign product $P_i$ is defined as follows:

$$P_i = F_{sub}(i) \cdot G_{sub}(i) \quad (3)$$

In some embodiments, the audio fingerprint matching module 120 applies a DCT transform on the columns of the (dot) product of DCT sign coefficients of $F_{sub}(i)$ and $G_{sub}(i)$ to calculate the correlation. Thus, the DCT sign-only correlation $C_i(k)$ of the DCT sign product $P_i$ is:

$$C_i(k) = 2 \sum_{n=0}^{N-1} P_i(n) \cos\left[\frac{\pi k}{2N}(2n+1)\right], \quad (4)$$
$$k = 0, 1, 2, \ldots, N-1$$

where N is the length of $P_i$. $P_i$ may be zero-padded to increase resolution. After obtaining Pi values for all the columns of DCT sign coefficients, the audio fingerprint matching module 120 calculates:

$$I = \underset{k}{\operatorname{argmax}}\ C_i(k). \quad (5)$$

I represents the relative position shift at which the correlation between two fingerprints is at a maximum. In this case, I is an integer value that represents an offset in frames, which typically equals zero. Using a phase or sign-only correlation allows for calculating an estimate of the subframe translation. By applying simple interpolation techniques, the signal delay is calculated with higher precision than the actual frame size. In some instances, I includes an array of values, not just a single value, for which the correlation attains values that are above a specified threshold value. Each value in the array corresponds to a position, at which the two signals match due to repeating patterns in the audio signal. Determining values of I above a specified threshold value therefore allows, for example, estimating the beat or tempo of music included in the signal. The distance between I values corresponds to the beat period. A typical beat period for modern music is about 1 second, and in some instances can range between 20-200 beats per minute (BPM).

To match the sample fingerprint to a reference audio fingerprint, the audio fingerprint matching module 120 measures the similarity between the audio characteristics of the sample fingerprint and the audio characteristics of the reference audio fingerprint based on the DCT sign-only correction between the sample fingerprint and the reference audio fingerprint. There exists a close relationship between the DCT sign-only correlation and the similarity based on phase-only correlation for image search. In other words, the similarity based on phase-only correlation is a special case of the DCT sign-only correlation. Applying this close relationship to the audio signal distortion detection, the DCT sign-only correlation between the sample fingerprint and the reference audio fingerprint closely approximates the similarity between the audio characteristics of the sample fingerprint and the audio characteristics of the reference audio fingerprint. The characteristics of the reference audio fingerprints may include on one or more features, such as the corresponding audio signal's tempo, timbral shape, and the like.

In some embodiments, the degree of the similarity or the degree of match between the audio characteristics of the sample fingerprint and the audio characteristics of the reference audio fingerprint is indicated by the absolute peak value of the DCT sign-only correlation function between the test audio fingerprint and the reference audio fingerprint. For example, a high absolute peak value of the DCT sign-only correlation function between the sample fingerprint and the reference audio fingerprint indicates that the sample fingerprint matches the reference audio fingerprint. Thus, a sample fingerprint matches a reference audio fingerprint if the DCT sign-only correlation between the sample fingerprint and the reference audio fingerprint has an absolute peak value higher than a threshold value. Alternatively, a bit error rate (BER) between the sample fingerprint and the reference audio fingerprint smaller than a BER threshold value indicates that the sample fingerprint matches the reference audio fingerprint.

Method for Generating a Fingerprint Index

Figure 4A:
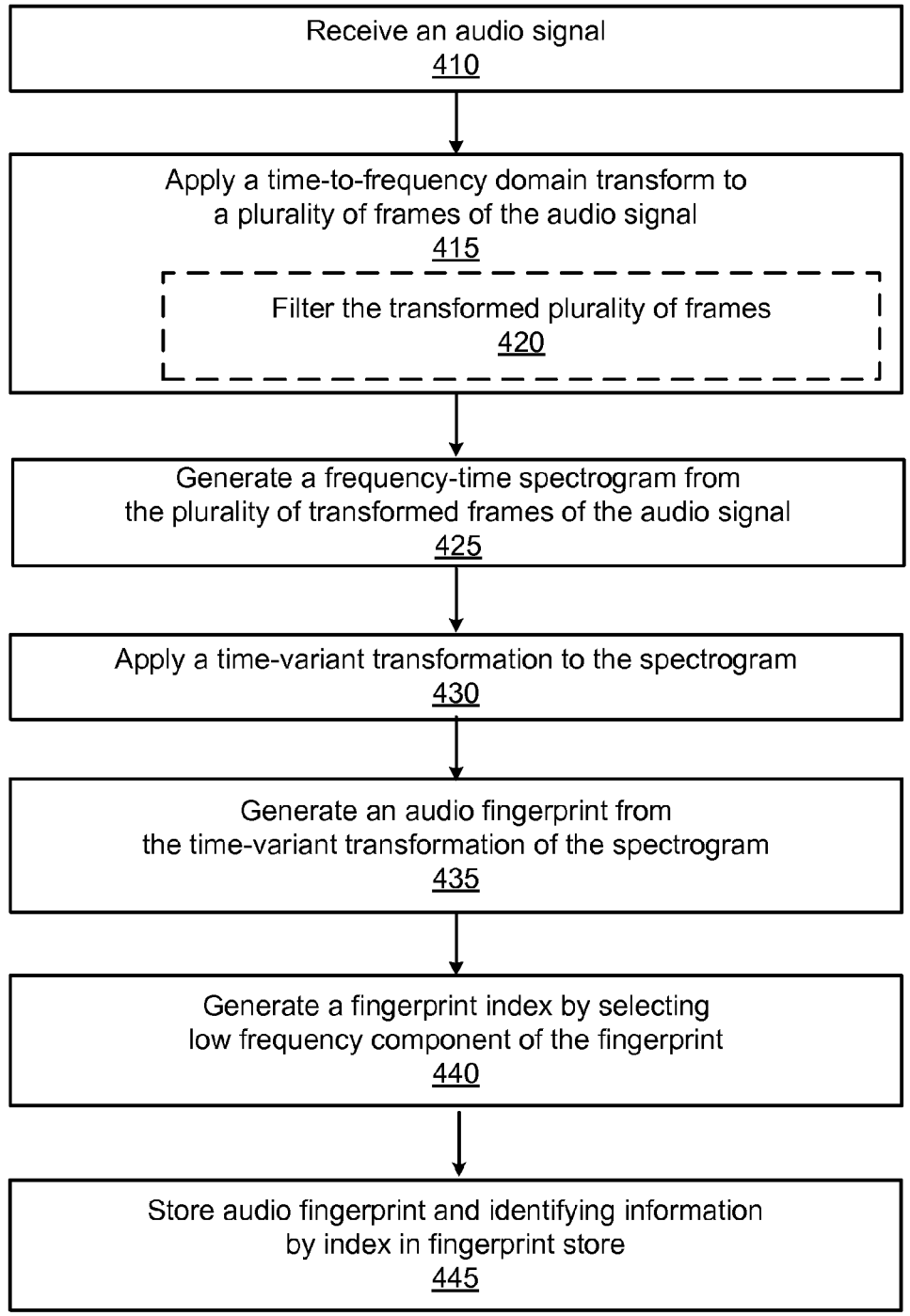
FIG. 4A is a flowchart of a method for indexing audio fingerprints for an audio signal, in accordance with some embodiments.

FIG. 4A is a flowchart of a method for indexing audio fingerprints for an audio signal, in accordance with some embodiments. For purposes of illustration, FIG. 4A describes generation of an audio fingerprint for an audio signal, but the described steps may be used to generate a fingerprint for any time-based signal. Initially, the audio identification system 100 receives 410 an audio signal. In some embodiments, the received audio signal is preprocessed by applying one or more operations to the audio signal, such as extracting metadata associated with the audio signal, normalizing the amplitude and dividing the audio signal into multiple audio frames.

To compactly represent the information contained in the audio signal, a time-to-frequency domain transform (e.g., a STFT) is applied 415 to a plurality of frames of the received audio signal. In some embodiments, the audio identification system 100 filters 420 the transformed audio signal by splitting each spectral frame of the transformed audio signal into multiple filter banks. For example, a 16-band third octave triangular filter bank is applied to each spectral frame of the transformed audio signal to obtain a matrix of 16×32 bins of spectral power of the corresponding spectral bandwidth. In some embodiments, the audio identification system 100 resamples each frequency band sample to produce a corresponding resample sequence that reduces the dimensionality of the energy spectrogram by combining multiple samples. Resampling is suitable for audio signals exhibiting slowly varying amplitude changes over very short time interval. In some embodiments, the audio identification system 100 filters out frequencies above and/or below a frequency threshold to reduce the dimensionality of the energy spectrogram.

The audio identification system 100 generates 425 a time-frequency spectrogram from the plurality of frequency-transformed frames of the audio signal. The system 110 then applies 430 a time-variant transformation to the time-frequency spectrogram of filtered or unfiltered frames to obtain a matrix of frequency coefficients, from which the system selects a set for generating a fingerprint. As described above, a time-variant transformation is any transform that depends on the phase information between different frames. For example, a DCT transform is applied 430 to the filtered audio signal to obtain a matrix of 64 selected DCT coefficients. In some embodiments that balance efficient representation and computation complexity, the audio identification system 100 maintains the sign information of the selected coefficients. For example, if a selected coefficient is greater than or equal to zero, a bit of "1" is included in the audio fingerprint, while a bit of "0" is included in the audio fingerprint if the selected coefficient is less than zero.

The audio fingerprint generation module 110 generates 435 an audio fingerprint of the received audio signal from the sign information of the selected coefficients. In some embodiments, the audio fingerprint is represented as a 64-bit integer. In some embodiments, columns, rows, or combinations of rows and columns in a matrix of values of sign information corresponding to coefficients of the time-variant transformed spectrogram, represented by a [M×T] matrix, as described above, are identified and used to generate 435 the audio fingerprint.

The audio identification system 100 generates 440 an index associated with the audio fingerprint for referencing the audio fingerprint and for efficiently retrieving the audio fingerprint. In some embodiments, the index associated with an audio fingerprint is a portion of the audio fingerprint or a hash value generated by applying a hash function to the audio fingerprint. In some embodiments, the index includes components of the frequency spectrum corresponding to the fingerprint that are less sensitive to noise or distortions of the audio signal, e.g., low-frequency components. In some embodiments, the audio identification system 100 stores 445 the audio fingerprint and identifying information by the fingerprint's index in the audio fingerprint store 130. Upon storing, the audio fingerprint is subsequently available as a reference fingerprint for other audio signals.

Method of Identifying Test Audio Signal

Figure 4B:
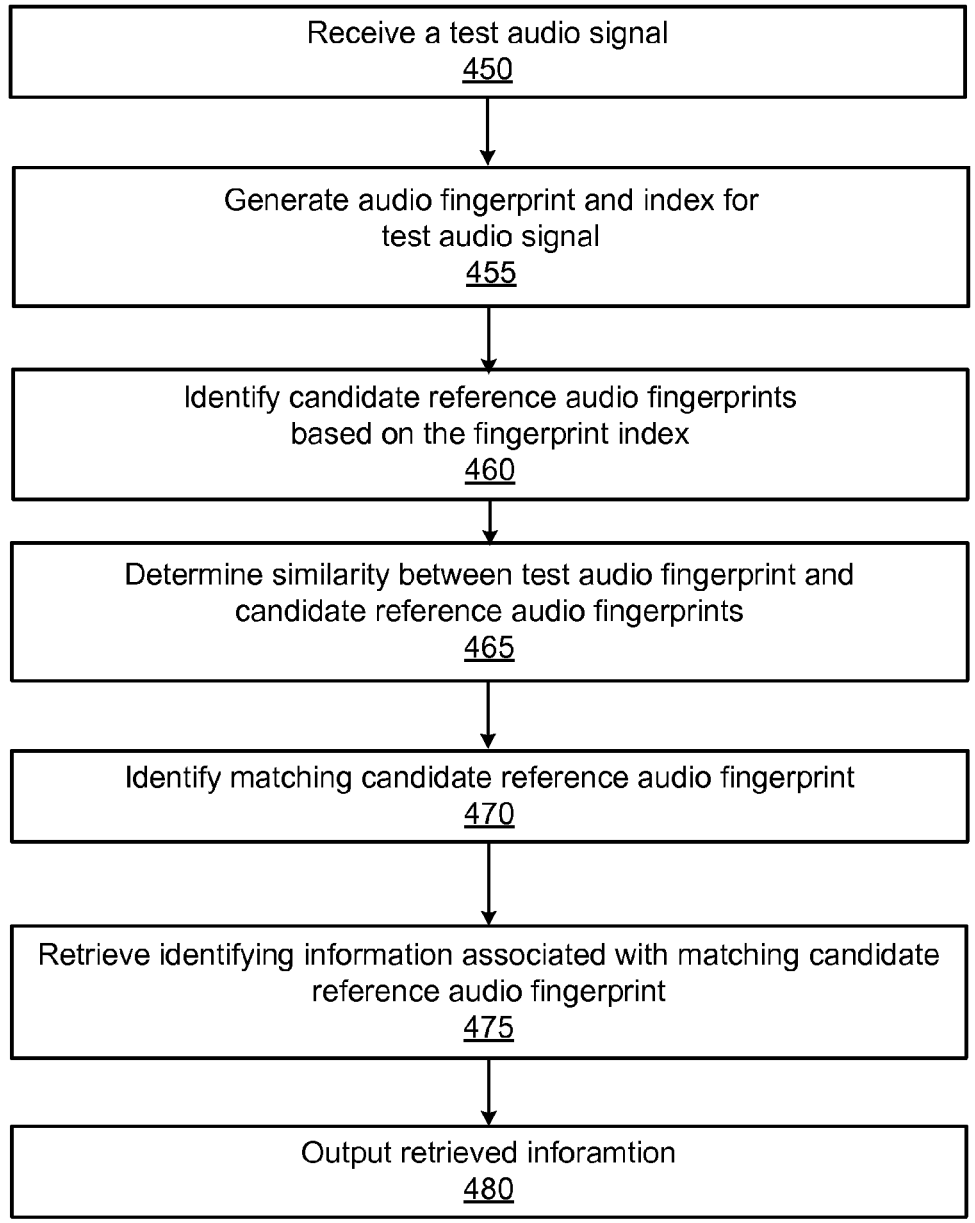
FIG. 4B is a flowchart of a method for identifying an audio signal using an indexed store of candidate reference audio fingerprints, in accordance with some embodiments.

FIG. 4B is a flowchart of a method for identifying an audio signal using an indexed store of candidate reference audio fingerprints, in accordance with some embodiments. Initially, the audio identification system 100 receives 450 a test audio signal, for which the system generates 455 an audio fingerprint and index as described in detail above. Based on the generated index one or more candidate reference audio fingerprints are identified 460 from reference audio fingerprints stored in audio fingerprint store 130. In some embodiments, the candidate reference audio fingerprints are identified 460 by reference to an index value that is identical to the index associated with test audio fingerprint.

In some embodiments, if no reference audio fingerprints with identical index values are identified, a bit error rate (BER) between the test audio fingerprint's index and the indexes associated with the reference audio fingerprint are calculated. If the BER equals or is less than a threshold value, the index associated with the test audio fingerprint is determined to match the index associated with the reference audio fingerprint. As described above in conjunction with FIGS. 1-3, the index associated with an audio fingerprint is based on components of the audio fingerprint corresponding to portions of the audio signal that are relatively insensitive to noise or distortions.

In some embodiments, if no reference audio fingerprints with identical index values are identified, the index associated with the test audio fingerprint is modified and the modified index is used to search among the indexes of the candidate reference audio fingerprints. A reference audio fingerprint associated with an index that is identical to the modified index is then returned as a candidate reference audio fingerprint. In some embodiments, individual bits of the index associated with the test audio fingerprint are modified (i.e., bit-flipped) to generate the modified index, although any suitable modification may be employed.

The audio identification module 110 determines 465 a similarity score between the test audio fingerprint and each identified candidate reference audio fingerprint. In some embodiments, the similarity score is a bit error rate (BER) between the test audio fingerprint and a candidate reference audio fingerprint. The BER between two audio fingerprints is the percentage of their corresponding bits that do not match. For unrelated and completely random audio fingerprints, the BER should ideally measure 50%. Alternatively, any other suitable criteria may be used to determine the similarity score between the test audio fingerprint and a candidate reference audio fingerprint, such as a DCT sign-only correlation as described above. Hence, the audio identification system 100 identifies candidate reference audio fingerprints as reference audio fingerprints with an index identical or otherwise similar to test audio fingerprint's index. Having identified candidates the system 100 then determines if a candidate reference audio fingerprint is a match with respect to the test audio fingerprint. In some embodiments, a match is found if the [m×t] matrices of the test and reference fingerprint match based on a similarity score with each [m×t] matrix being a sub-matrix of the [M×T] fingerprint matrix, i.e. m<M and t<T. In some embodiments, the entries of the [m×t] matrix represent noise- and/or distortion-insensitive portions of the fingerprint matrix. For example, the 64-bit matrix can be divided into several 32-bit sub-matrices as to the top, bottom, left, and right region of the 64-bit matrix, each of which is match separately against corresponding regions of the reference fingerprint matrix. In some embodiments, on the top part of the matrices between the test and reference fingerprint are matched, while the bottom parts are ignored. In some embodiments, this technique is also applied to identifying an index from the reference fingerprint indexes based on comparing their sub-parts with each other. In some embodiments, multiple indexes are generated from different parts of the [M×T] fingerprint matrix, e.g., parts that are insensitive to noise and/or distortions of the underlying audio signal.

One or more candidate reference audio fingerprints matching the test audio fingerprint are identified 470 based on the similarity scores between the test audio fingerprint and candidate reference audio fingerprints. In one embodiment, two audio fingerprints are determined to be matching if the BER is less than 35%; however, other threshold values may be specified. Based on the similarity scores, candidate reference audio fingerprints matching the test audio fingerprint are identified 470. Besides BER other criteria can be used to compare the test audio fingerprint with each candidate reference audio fingerprint including the match rate, the inverse measure of BER, or DCT sign-only correlation. Furthermore, certain bits of the audio fingerprint may be weighted more highly than others in the comparing two fingerprints, e.g., the bits representing the low frequency coefficient may be more heavily weighted when determining 465 similarity scores.

The audio identification system 100 retrieves 475 identifying information associated with one or more candidate reference audio fingerprints identified 470 as matching the test audio fingerprint. The identifying information may be retrieved 475 from the audio fingerprint database 130, from one or more external systems 203, and/or from any other suitable entity. The audio identification system 100 outputs 480 the retrieved information, including the matching results. For example, the audio identification system 100 sends the identifying information to a client device 202 that initially requested identification of the audio signal. The identifying information allows a user of the client device 202 to determine information related to the audio signal. For example, the identifying information indicates that the audio signal is produced by a particular device or indicates that the audio signal is a song with a particular title, artist, or other information.

In some embodiments, the audio identification system 100 outputs 480, i.e. provides the retrieved identifying information to the social networking system 205 via the network 204. The social networking system 205 may update a newsfeed or user's user profile, or may allow a user to do so, to indicate the user requesting the audio identification is currently listening to a song identified by the identifying information. In some embodiments, the social networking system 205 communicates the identifying information to one or more additional users connected to the user requesting identification of the audio signal over the social networking system 205.

SUMMARY

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure. It will be appreciated that the embodiments described herein may be combined in any suitable manner.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may include a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the disclosure may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method. Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

What is claimed is:

1. A computer-implemented method comprising:
   obtaining a sample of an audio signal;
   determining a plurality of frames within the sample, each frame representing a time-interval of the sample and overlapping with one or more adjacent frames of the plurality of frames;
   determining a frequency spectrum for each frame of the plurality of frames by applying a time domain to frequency domain transformation to each frame of the plurality of frames;
   generating a time-sequence of frequency spectrums from the frequency spectrums for each frame, the time-sequence of frequency spectrums comprising a two-dimensional array of the frequency spectrums over time;
   determining a plurality of frequency components by applying a time-variant transformation to the time-sequence of frequency spectrums, the plurality of frequency components comprising unstable frequency components and stable frequency components, the stable frequency components being less sensitive to noise or distortions than the unstable frequency components;
   generating an audio fingerprint, the audio fingerprint comprising the plurality of frequency components;
   generating a first index associated with the audio fingerprint, the first index comprising the stable frequency components of the plurality of frequency components, and the first index comprising fewer frequency components than the audio fingerprint;
   maintaining a plurality of reference audio fingerprints, each reference audio fingerprint associated with an index and identifying information;
   in response to determining that the first index does not match any index of a reference audio fingerprint of the plurality of reference audio fingerprints:
      generating a second index associated with the audio fingerprint using at least one of the unstable frequency components;
      selecting a reference audio fingerprint of the plurality of reference audio fingerprints based on (i) the corresponding index associated with the selected reference audio fingerprint and (ii) the second index associated with the audio fingerprint;
      determining a similarity score between the selected reference audio fingerprint and the audio fingerprint; and
      in response to determining that the similarity score is greater than a threshold value, communicating the corresponding identifying information associated with the selected reference audio fingerprint to a client device for presentation.

2. The computer-implemented method of claim 1, wherein the time domain to frequency domain transformation is a Short-Time Fourier Transform (STFT).

3. The computer-implemented method of claim 1, further comprising:

filtering the frequency spectrum for each frame from the plurality of frames, wherein the time-sequence of frequency spectrums are selected from the filtered frequency spectrums for each frame.

4. The computer-implemented method of claim 3, wherein filtering the frequency spectrum for each frame from the plurality of frames comprises:
applying a 16-band filter to the frequency spectrum for each frame.

5. The computer-implemented method of claim 4, wherein the 16-band filter is a 16-band third octave triangular filter, and wherein applying the 16-band filter to a frequency spectrum for a frame of the plurality of frames splits the frequency spectrum into 16 filter banks.

6. The computer-implemented method of claim 1, wherein the time-variant transformation is selected from a group of transforms consisting of: a Fast Fourier Transform (FFT), a Discrete Hartley Transform (DHT), a Discrete Wavelet Transform (DWT), a Discrete Sine Transform (DST), a Mellin Transform, and a Discrete Cosine Transform (DCT).

7. The computer-implemented method of claim 1, wherein applying the time-variant transform to the frequency spectrum of each frame comprises:
generating a matrix of components from the time-variant transformation, each component having a representation of sign information.

8. The computer-implemented method of claim 1, wherein generating the audio fingerprint comprises:
selecting sign information for the audio fingerprint;
generating the audio fingerprint of the audio signal from the sign information; and
representing the audio fingerprint as an integer having a specified number of bits.

9. The computer-implemented method of claim 8, wherein generating the first index associated with the audio fingerprint comprises:
selecting a subset of bits of the specified number of bits of the integer.

10. The computer-implemented method of claim 1, further comprising:
storing the audio fingerprint and an association between the second index and the audio fingerprint.

11. The computer-implemented method of claim 1, wherein selecting the reference audio fingerprint of the plurality of reference audio fingerprints is further based on a bit error rate between the corresponding index associated with the selected reference audio fingerprint and the second index associated with the audio fingerprint.

12. The computer-implemented method of claim 1, wherein determining the similarity score is based on a bit error rate between the selected reference audio fingerprint and the audio fingerprint.

13. The computer-implemented method of claim 12, further comprising:
determining that the bit error rate is less than a threshold bit error rate.

14. The computer-implemented method of claim 1, further comprising:
storing the audio fingerprint according to the first index in a database.

15. A non-transitory computer readable storage medium storing one or more programs, the one or more programs comprising instructions, which when executed by a processor, cause the processor to:
obtain a sample of an audio signal;
determine a plurality of frames within the sample, each frame representing a time-interval of the sample and overlapping with one or more adjacent frames of the plurality of frames;
determine a frequency spectrum for each frame of the plurality of frames by applying a time domain to frequency domain transformation to each frame of the plurality of frames;
generate a time-sequence of frequency spectrums from the frequency spectrums for each frame, the time-sequence of frequency spectrums comprising a two-dimensional array of the frequency spectrums over time;
determine a plurality of frequency components by applying a time-variant transformation to the time-sequence of frequency spectrums, the plurality of frequency components comprising unstable frequency components and stable frequency components, the stable frequency components being less sensitive to noise or distortions than the unstable frequency components;
generate an audio fingerprint, the audio fingerprint comprising the plurality of frequency components;
generate a first index associated with the audio fingerprint, the first index comprising the stable frequency components of the plurality of frequency components, the first index comprising fewer frequency components than the audio fingerprint;
maintain a plurality of reference audio fingerprints, each reference audio fingerprint associated with an index and identifying information;
in response to determining that the first index does not match any index of a reference audio fingerprint of the plurality of reference audio fingerprints:
generate a second index associated with the audio fingerprint using at least one of the unstable frequency components;
select a reference audio fingerprint of the plurality of reference audio fingerprints based on (i) the corresponding index associated with the selected reference audio fingerprint and (ii) the second index associated with the audio fingerprint;
determine a similarity score between the selected reference audio fingerprint and the audio fingerprint ; and
in response to determining that the similarity score is greater than a threshold value, communicate the corresponding identifying information associated with the selected reference audio fingerprint to a client device for presentation.

16. The non-transitory computer readable storage medium of claim 15, wherein the time domain to frequency domain transformation is a Short-Time Fourier Transform (STFT).

17. The non-transitory computer readable storage medium of claim 15, wherein the time-variant transformation is selected from a group of transforms consisting of: a Fast Fourier Transform (FFT), a Discrete Hartley Transform (DHT), a Discrete Wavelet Transform (DWT), a Discrete Sine Transform (DST), a Mellin Transform, and a Discrete Cosine Transform (DCT).

18. The non-transitory computer readable storage medium of claim 15, wherein generating the audio fingerprint comprises:
select sign information for the audio fingerprint;
generate the audio fingerprint of the audio signal from the sign information; and
represent the audio fingerprint as an integer having a specified number of bits.

19. The non-transitory computer readable storage medium of claim 18, wherein generating the first index associated with the audio fingerprint comprises:
   select a subset of bits of the specified number of bits of the integer.

\* \* \* \* \*